US008011410B2

(12) United States Patent
Huang

(10) Patent No.: US 8,011,410 B2
(45) Date of Patent: Sep. 6, 2011

(54) DRIVING MECHANISM FOR LABELING MACHINE

(76) Inventor: Fu-Chuan Huang, Chiayi County (TW)

( * ) Notice: Subject to any disclaimer, the term of this patent is extended or adjusted under 35 U.S.C. 154(b) by 369 days.

(21) Appl. No.: 12/412,369

(22) Filed: Mar. 27, 2009

(65) Prior Publication Data

US 2010/0242648 A1 Sep. 30, 2010

(51) Int. Cl.
*B32B 15/00* (2006.01)

(52) U.S. Cl. .......... 156/541; 156/538; 156/540; 74/396; 474/101; 474/136; 474/137

(58) Field of Classification Search ........................ None
See application file for complete search history.

(56) References Cited

U.S. PATENT DOCUMENTS

2010/0248877 A1* 9/2010 Huang .......................... 474/136

* cited by examiner

*Primary Examiner* — Kimberly K McClelland
(74) *Attorney, Agent, or Firm* — Muncy, Geissler, Olds & Lowe, PLLC

(57) ABSTRACT

A driving mechanism for a labeling machine includes a plurality of driving arm assemblies and a gear set. The driving arm assemblies and the gear set are independent and can rotate quickly and are less likely to be worn off, and can drive feeding wheels coupled on axles to rotate concurrently to draw and convey a roll of film. A dust guarding plate is provided to surround a base. The driving mechanism provides secure transmission and simple repair and maintenance.

9 Claims, 7 Drawing Sheets

DRIVING MECHANISM FOR LABELING MACHINE

FIELD OF THE INVENTION

The present invention relates to an improved driving mechanism for labeling machine that has a driving arm assembly and a gear set to perform high speed transmission in a simple structure.

BACKGROUND OF THE INVENTION

The driving mechanism of a conventional labeling machine, referring to FIG. 1, has a transmission assembly 4*a* consisting of a plurality of pulleys 42*a* coupled with a plurality of linking bars 41*a* and belts 44*a*, and axles 46*a* with an adjustable width to mate a center guide post holding label films of varying dimensions.

The conventional labeling machine also has a linking belt 48*a* to link a driving wheel 40*a* and a linking pulley 43*a*. A pulley shaft 421*a* is provided to connect to pulleys 42*a* on the linking bars 41*a*. The pulleys 42*a* at two ends of the linking bar 41*a* are transmitted by the belts 44*a*. The pulleys 42*a* on the neighboring linking bars 41*a* are coupled on the pulley shaft 421*a*. Thus the linking bars 41*a* and the belts 44*a* are linked in a selected order. During repair and maintenance, the belts 44*a* cannot be removed and displaced individually. All the belts 44*a* at the front end and rear end have to be disassembled, then assembled and installed again in the selected order. It takes a great deal of time. Moreover, the belts 44*a* between the linking bars 41*a* of the transmission assembly 4*a* have to be wound in a staggered manner to prevent mutual friction. Hence a greater space is required. In addition, the space needed to adjust the tension of the numerous belts 44*a* is limited, the tension of the belts 44*a* vary, transmission speed is uneven and transmission quality is affected. Furthermore, the adjustment mechanism comprising the linking bars 41*a* can only be anchored on the linking pulley 43*a* and the axle 46*a*, and the rest linking bars 41*a* mounted on the pulley shaft 421*a* are suspended. Hence shaking frequently occurs on the linking bars 41*a* that further impacts transmission effect of the belts 44*a*. This results in a shortened life span of the elements. There are still rooms for improvement.

In short, the driving mechanism of the conventional labeling machine still has many drawbacks in practice, notably:

1. A greater number of belts are needed. Replacement of the belts is tedious and wastes a lot of manpower and time.
2. The transmission elements occupy a great deal of space and result in difficult space configuration.
3. The belts are numerous and their tension is difficult to control, and result in uneven speed.
4. The transmission elements have many moving hinges. Shaking takes place and steadiness suffers.

SUMMARY OF THE INVENTION

The primary object of the present invention is to overcome the problems of the driving mechanism of the conventional labeling machine such as easy wearing and difficulty of maintenance and replacement of belts. The present invention provides an approach of driving a driving wheel from a power source such as an electric motor and having a driving arm assembly with a gear set located thereon driven by the driving wheel to transmit two axle wheels so that feeding wheels mounted on distal ends of two axles can rotate in opposite directions. Through a movable driving arm, the distance between the two feeding wheels can be adjusted. The gear set on the driving arm assembly has engaged gears which can effectively and rapidly transmit power. Assembly and repair and maintenance also are easier.

To achieve the aforesaid object, the present invention provides the following features: the gear set is coupled on the movable driving arm assembly with the engaged gears thereof quickly and effectively transmitting power to the feeding wheels on the axles. Maintenance is performed by merely disposing lube oil to the gears regularly. Accuracy can be enhanced, and assembly and repair and maintenance also are easier.

The invention also provides another feature of deploying individually or jointly. In a joint application that requires multiple feeding wheels, a linking member is provided to connect different driving arm assemblies and axle assemblies. A belt also is provided to connect the transmission wheel and another transmission wheel of another linking member so that the driving arm assemblies are driven concurrently, and the feeding wheels on the axle assemblies are driven to rotate concurrently.

The present invention provides many benefits, notably:

1. Using the gear set as the transmission mechanism of the driving arm, power transmission is fast and secured, and can be controlled accurately. Assembly and repair and maintenance also are easier.
2. Multiple linking members can be connected in series according to requirements to transmit motion between the driving arm assembly and axle assembly. The gears and belts are independent. Replacement is simpler.
3. Each linking member requires only one belt. Repair and maintenance are easier.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
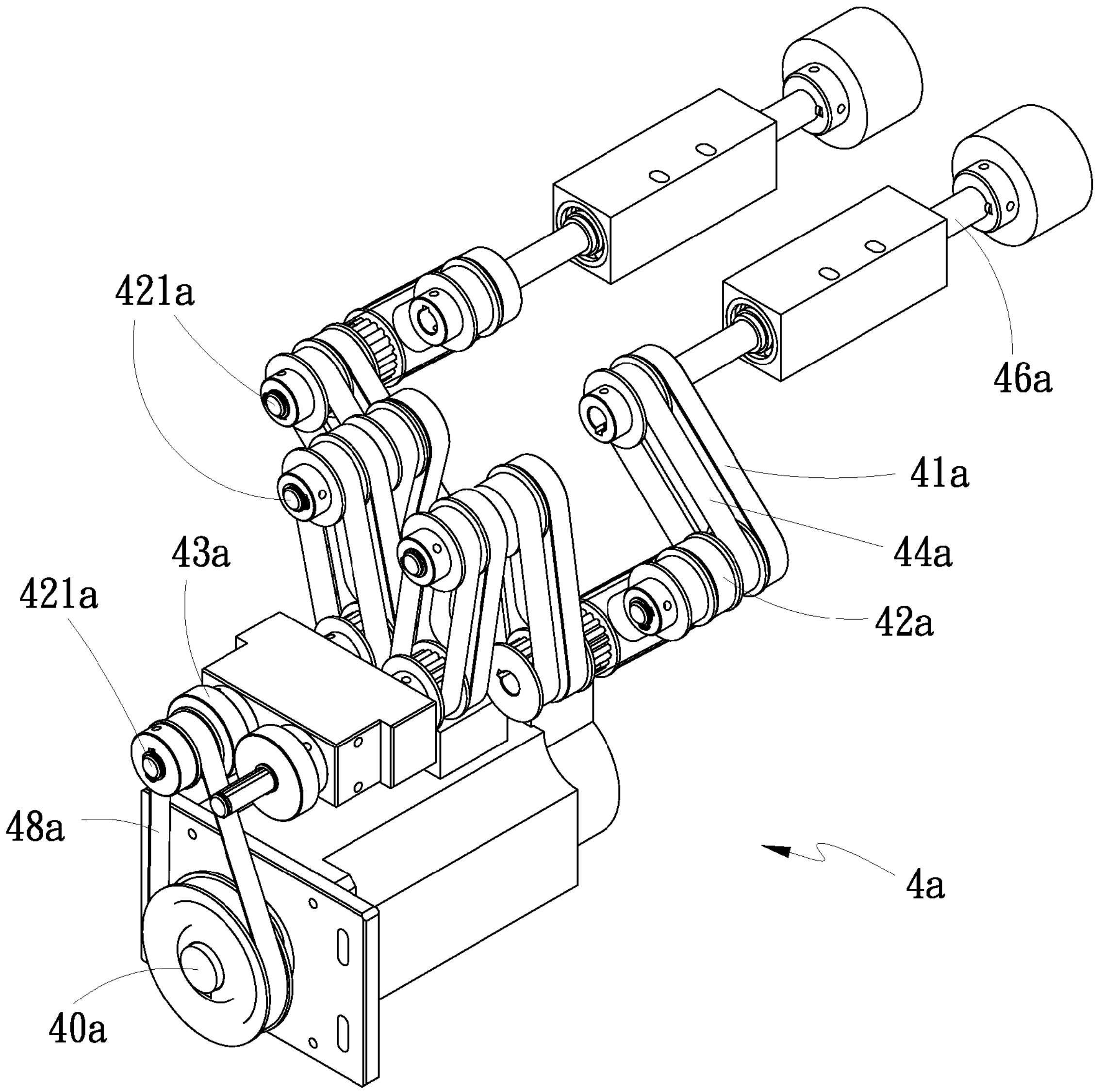
Fig. 1 PRIOR ART
FIG. 1 is a perspective view of the driving mechanism of a conventional labeling machine.
Figure 2:
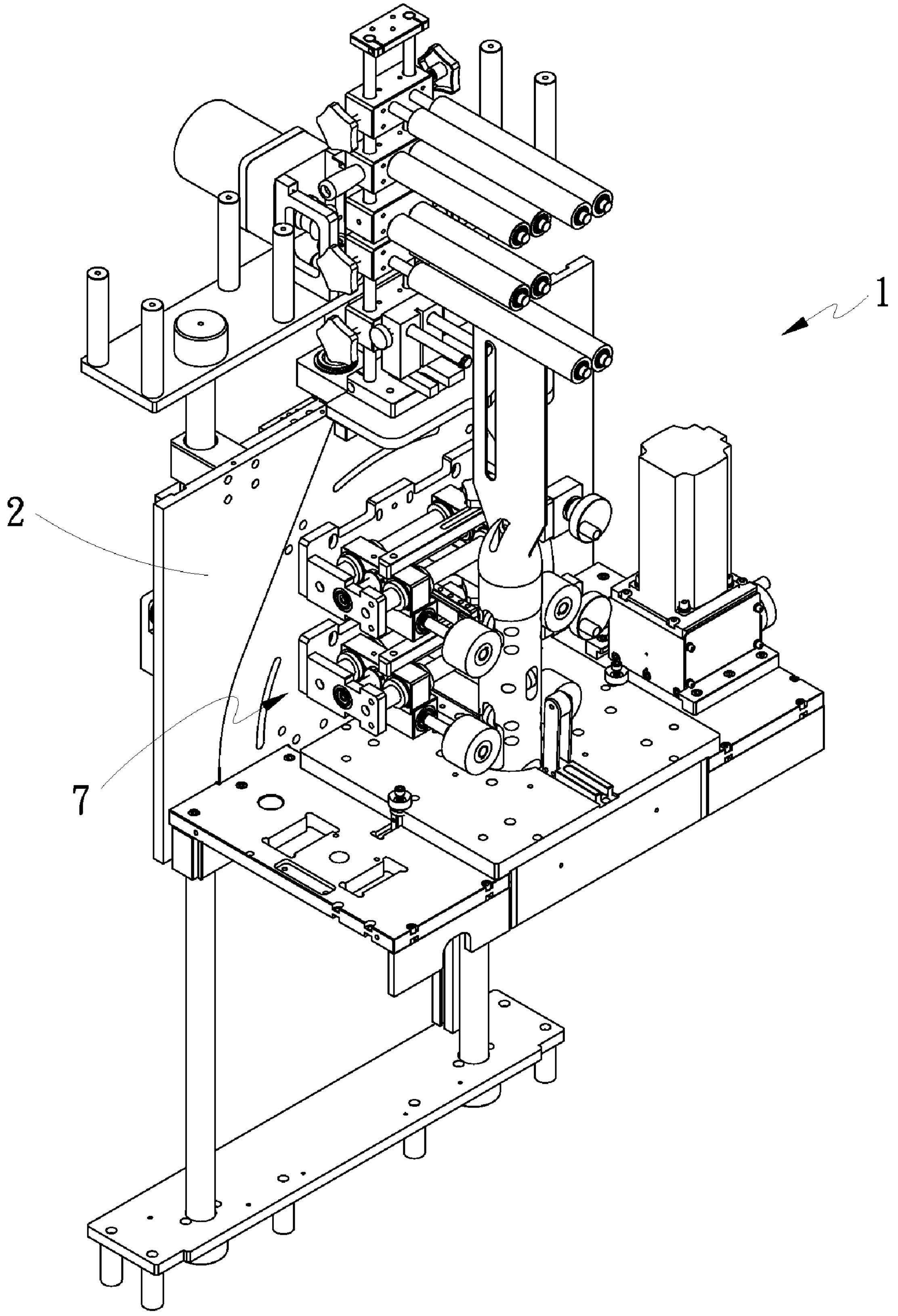
FIG. 2 is a perspective view of the labeling machine of the invention.

Please refer to FIGS. 2, 3, 5 and 6, the driving mechanism for labeling machine according to the invention is connected to a power source such as an electric motor and includes a driving wheel 3 formed with teeth, a base 4, a linking member 5, a driving arm assembly 6, an axle assembly 7 and a dust guarding plate 8.

The base 4 is fastened to a chassis 2 of a labeling machine through an angular post 21 and has at least one boss 40 which has two axle holes 401 running through.

The linking member 5 is located on the back side of the base 4, and includes a set of shafts 51, a set of transmission wheels 52 and a belt 53. The shaft 51 has one end coupling with the transmission wheel 52 and the other end running through the axle hole 401 of the boss 40 from the rear side of the base 4. The transmission wheel 52 has teeth formed on the perimeter. The belt 53 is annular and has teeth formed on an inner side and one end coupling on the transmission wheel 52.

The driving wheel 3 is coupled with the belt 53 of the linking member 5 and is connected to the power source such as a motor, and engaged with the belt 53 through teeth formed thereon to drive the transmission wheel 52.

Referring to FIGS. 3 through 6, the driving arm assembly 6 is located on the boss 40 of the base 4, and includes two corresponding front rocking arms 61, two corresponding rear rocking arms 62 and one gear set 63. The gear set 63 may consist of spur gears or helical gears which form enhanced engagement with each other. The gears include two transmission gears 631, two linking gears 632 and two axle gears 633. The two front rocking arms 61 have one end run through by two shafts 51 of the linking members 5. The shafts 51 have other ends coupled with the transmission gears 631. The two transmission gears 631 engage with each other. The front rocking arms 61 have the other end and the rear rocking arm 62 has one end connecting to the axle portion of the linking gear 632 which in turn engages with the transmission gear 631. Each axle gear 633 has a fastening hole 6331 formed on the other end of the rear rocking arm 62 to engage with the linking gear 632.

The axle assembly 7 is connected to the driving arm assembly 6, and includes one set of axles 71, one set of axle adjustment members 72 and one set of feeding wheels 73. Each axle 71 is coupled in the fastening hole 6331 of the axle gear 633. Each axle adjustment member 72 is located on a middle portion of the axle 71 to adjust the distance between the two axles 71. The two axles 71 have respectively a distal end coupling with one feeding wheel 73.

Figure 3:
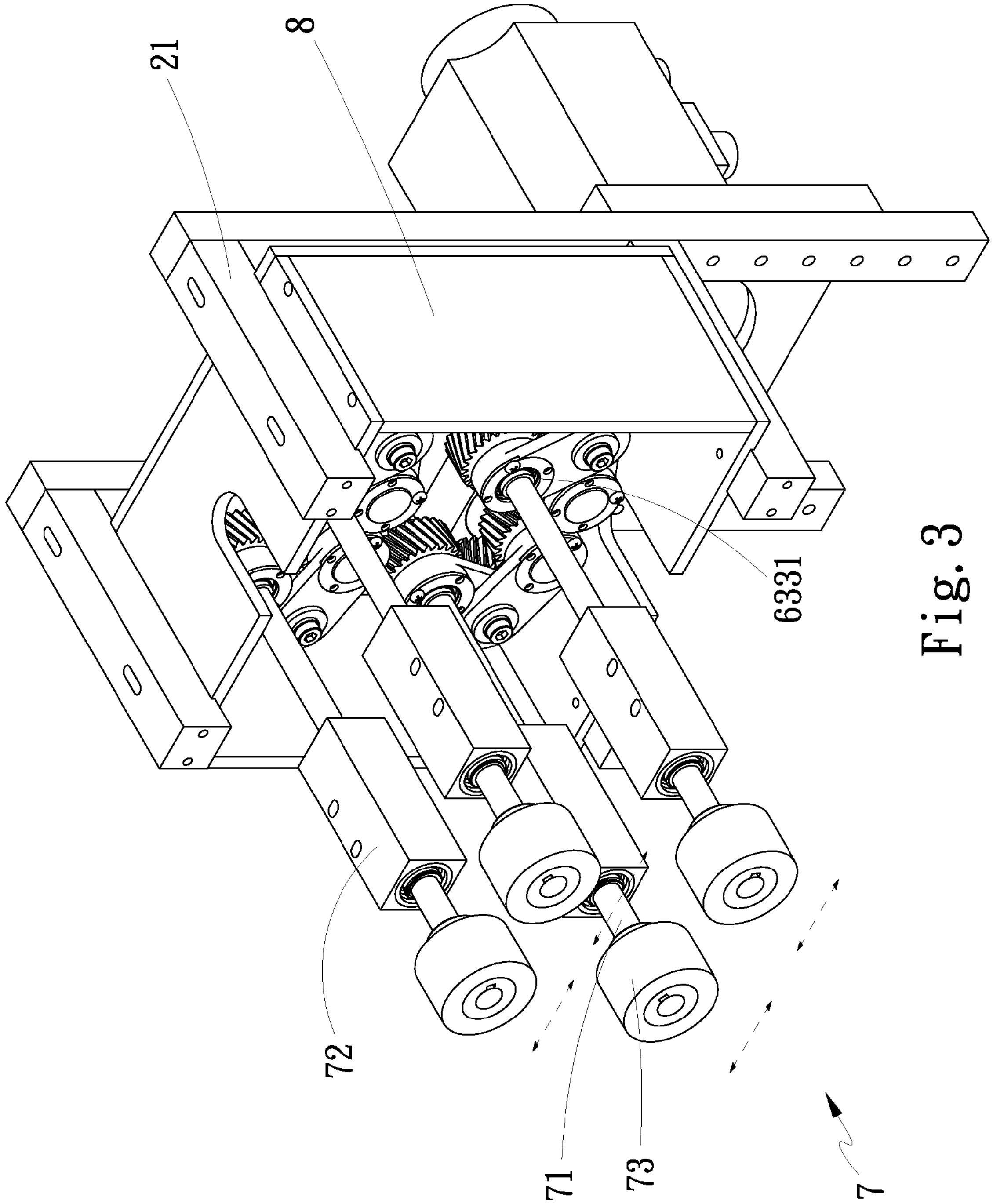
FIG. 3 is a perspective view of the driving mechanism of the labeling machine of the invention in a use condition.
Figure 4:
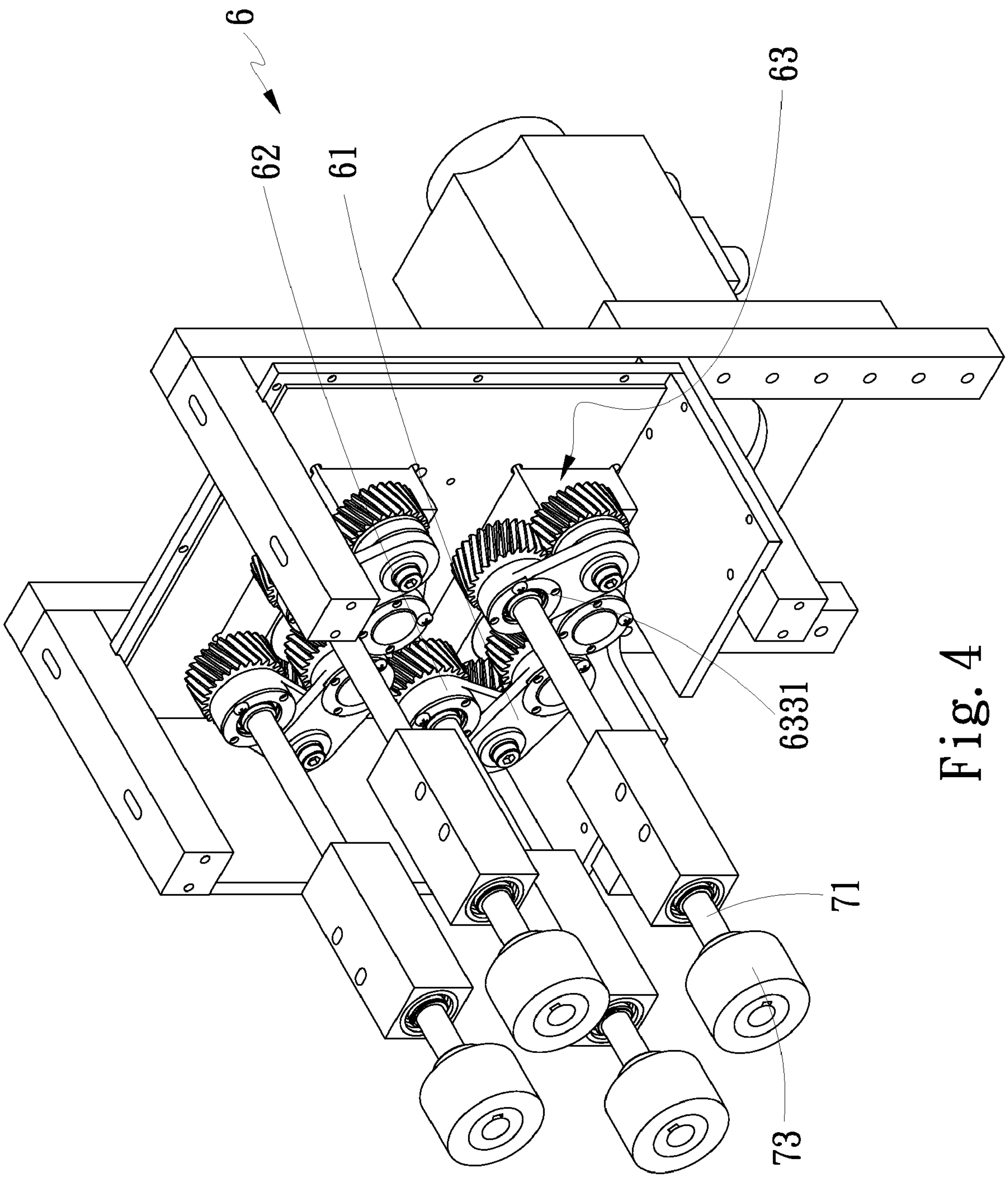
FIG. 4 is a perspective view of the driving mechanism of the labeling machine of the invention.
Figure 5:
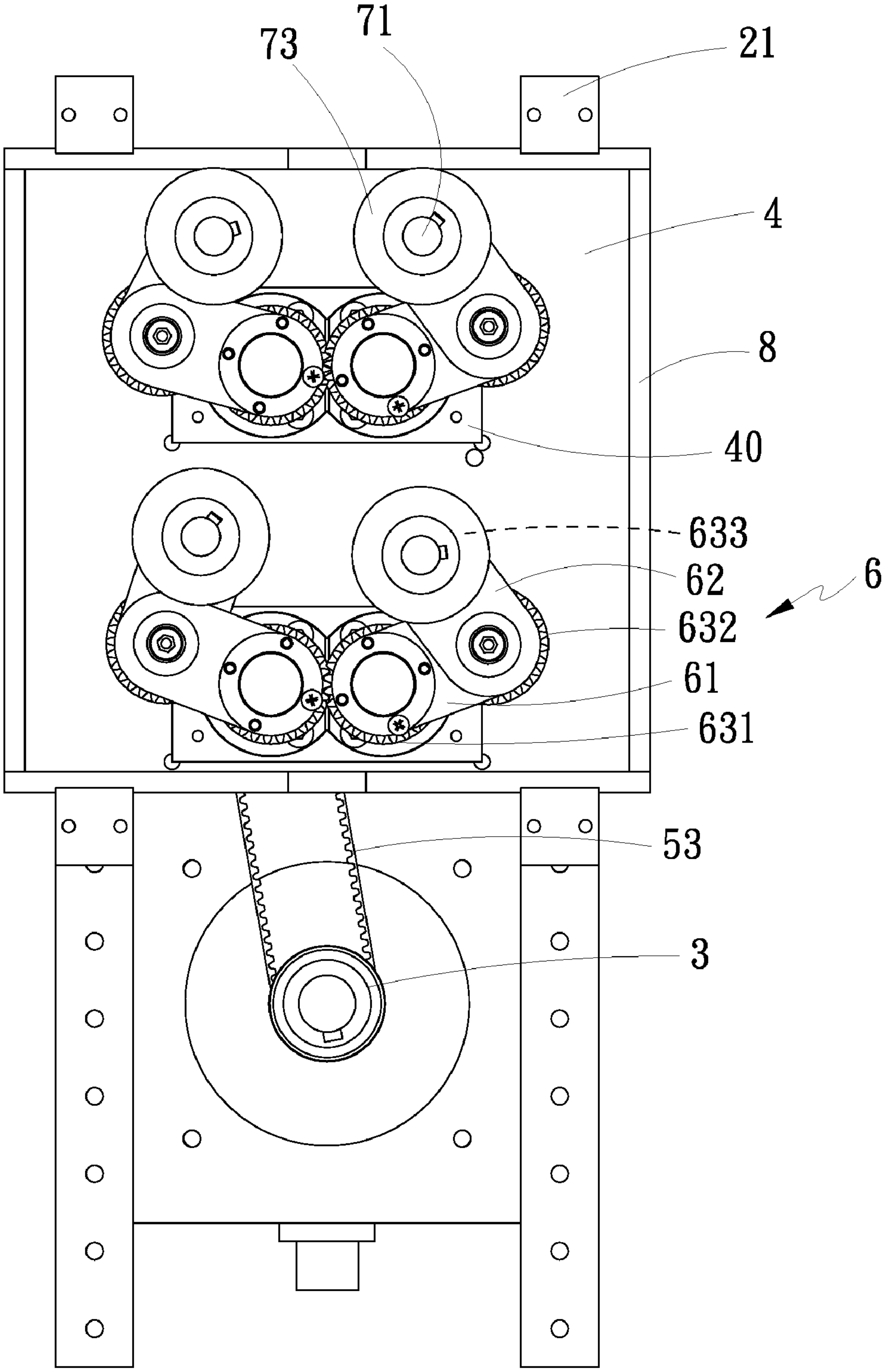
FIG. 5 is a front view of the driving mechanism of the labeling machine of the invention.
Figure 6:
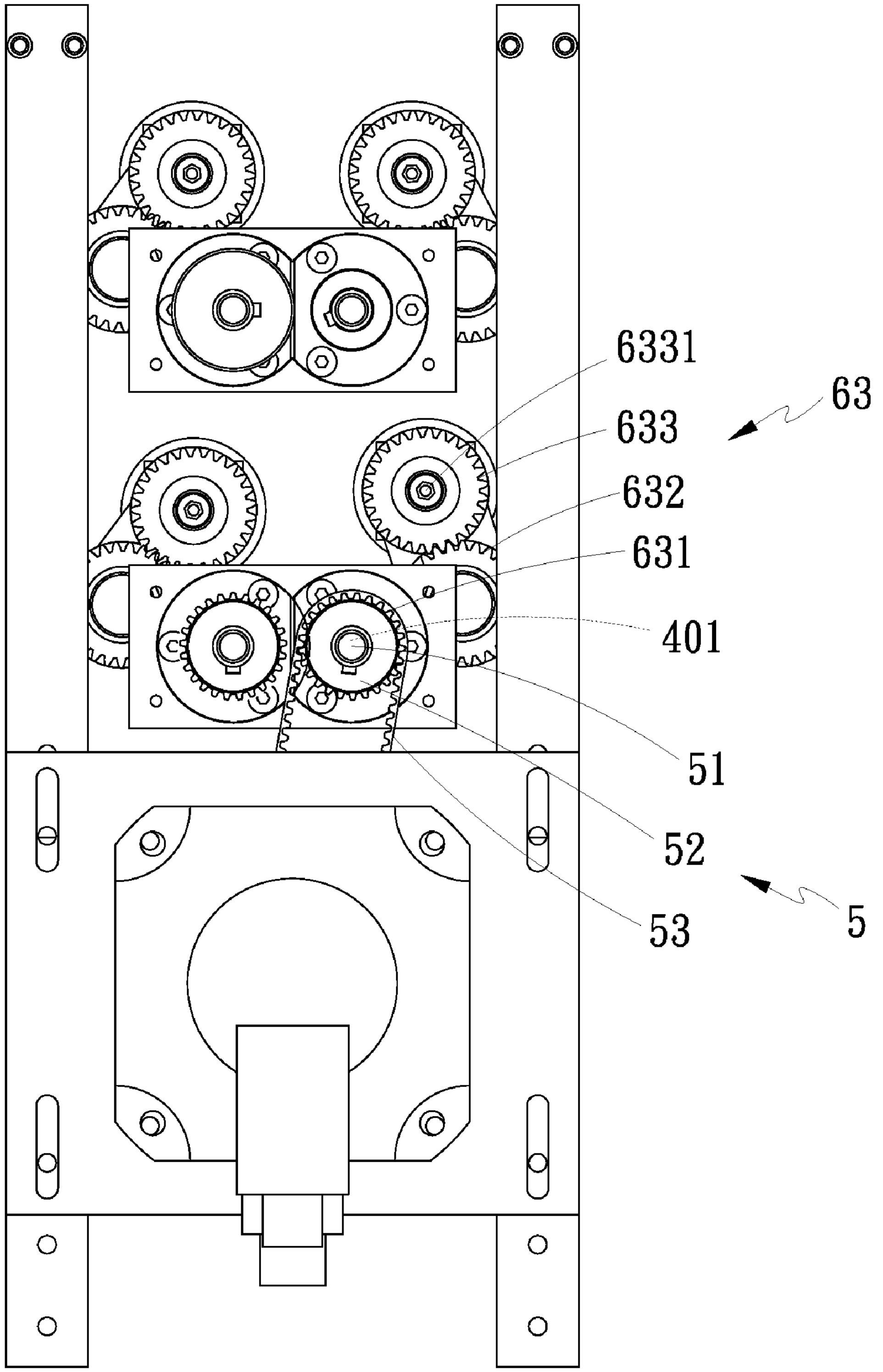
FIG. 6 is a rear view of the driving mechanism of the labeling machine of the invention, with the base board removed.

Referring to FIGS. 3 and 5, the duct guarding plate 8 is a thin plate surrounding the base 4 to prevent external materials and dust from entering the driving arm assembly 6.

Figure 7:
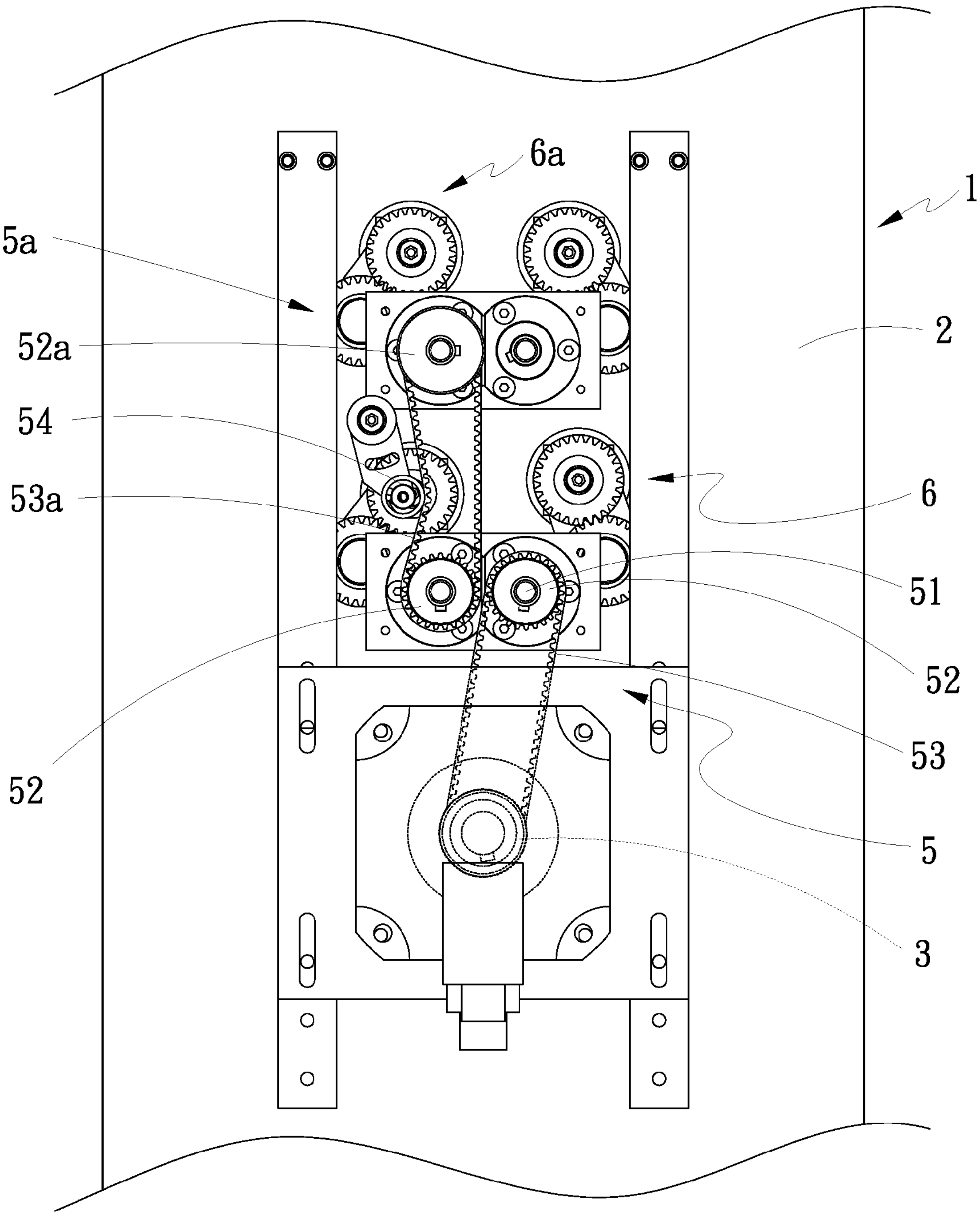
FIG. 7 is a schematic view of an embodiment of a dual driving approach according to the invention.

Referring to FIGS. 5 and 7, when the driving wheel 3 is driven by the power source such as an electric motor, it drives the belt 53 of the linking member 5 to rotate the transmission wheel 52; the shaft 51 of the transmission wheel 52 transmits the power to the transmission gear 631 at one end of the front rocking arm 61 at the front side of the base 4; the transmission gear 631 drives another transmission gear 631 at one end of another front rocking arm 61 so that the two transmission gears 631 rotate concurrently in opposite directions; then the two rotating transmission wheels 631 drive the engaged linking gears 632 that are overlapped with the front and rear rocking arms 61 and 62; the linking gears 632 further drive the axle gears 633 at the other end of the rear rocking arms 62, and the axles 71 of the axle gears 633 also are driven and rotate; therefore, the feeding wheels 73 at the other end of the axles 71 rotate concurrently in opposite directions.

The driving mechanism of the invention may be deployed independently or in a joint manner. When used in the joint manner, two sets of the same driving mechanisms can be coupled together to allow the labeling machine 1 to operate in a dual driving fashion. In such a circumstance, a set of idler pulleys 54 are installed on the base 4, and the belt 53*a* of the linking member 5*a* of the second set is adjusted. No adjustment is required on the first set. The belt 53 is coupled with one transmission wheel 52 and driving wheel 3. But the belt 53*a* of the linking member 5*a* of the second set is coupled with another transmission wheel 52 of the linking member 5 of the first set and another transmission wheel 52*a* of the linking member 5*a* of the second set at the same side. The belt 53*a* of the linking member 5*a* of the second set is pushed by the idler pulley 54 to maintain the belt 53*a* at a desired tension. Then the two linking members 5 and 5*a* can be driven concurrently by the driving wheel 3. As previously discussed, when the transmission wheels 52 and 52*a* of the two linking members 5 and 5*a* rotate, the two driving arm assemblies 6 and 6*a* also are driven concurrently.

What is claimed is:

1. A driving mechanism for a labeling machine, comprising a driving wheel connecting to a power source of an electric motor, a base, a linking member, a driving arm assembly, an axle assembly and a set of dust guarding plates, wherein:

the base is fastened to a chassis of the labeling machine through an angular post;

the linking member is located on and runs through the base and includes a set of shafts, a set of transmission wheels and a belt; the shaft having one end coupling with the transmission wheel and the other end running through the base from a rear side thereof; the belt is coupled with the transmission wheel;

the driving wheel is located on the power source and coupled with the belt of the linking member;

the driving arm assembly is mounted onto the base and includes two corresponding front rocking arms, two corresponding rear rocking arms and a gear set; the gear set including two transmission gears, two linking gears and two axle gears; the two front rocking arms having one end run through by the shaft of each linking member to form fixed fastening, the shaft having the other end coupled with the transmission wheel, and the transmission wheels engage with each other; the front rocking arms having other end coupled with one end of the rear rocking arms through the shaft of the linking gears, the linking gears engaging with the transmission gears, the axle gears are located on the other end of the rear rocking arms and engaged with the linking gears;

the axle assembly is fixedly coupled with the axle gears of the driving arm assembly; and the dust guarding plates are thin sheets surrounding the base to prevent external material and dust from entering the driving arm assembly.

2. The driving mechanism of claim 1, wherein the base has at least one boss which has two axle holes run through by the shaft of the linking member.

3. The driving mechanism of claim 1, wherein each of the axle gears has a fastening hole to couple with an axle.

4. The driving mechanism of claim 1, wherein the axle assembly includes the axles, a set of axle adjustment members and a set of feeding wheels; each axle adjustment member is located on a middle portion of the axle to adjust the distance between the two axles.

5. The driving mechanism of claim 1, wherein the transmission gears, the linking gears and the axle gears are helical gears which form enhanced engagement with each other.

6. The driving mechanism of claim 1, wherein the transmission gears, the linking gears and the axle gears are spur gears.

7. The driving mechanism of claim 1, wherein the belt of the linking member has an inner side with teeth formed thereon.

8. The driving mechanism of claim 1, wherein the driving wheel and the transmission wheels have teeth formed on the perimeters thereof.

9. The driving mechanism of claim 1, wherein multiple sets of the driving arm assemblies are coupled through the belt of the linking member to form a multi-driving mechanism.

* * * * *